US010269325B2

United States Patent
Sivertsen et al.

(10) Patent No.: US 10,269,325 B2
(45) Date of Patent: Apr. 23, 2019

(54) DISPLAY SYSTEM FOR AN ARRAY OF VIDEO DISPLAYS

(71) Applicant: ADVOLI Limited, Wanchai OT (HK)

(72) Inventors: Clas Gerhard Sivertsen, Lilburn, GA (US); Paal Fure Torkehagen, Taipei (TW)

(73) Assignee: ADVOLI LIMITED, Wan Chai (HK)

( * ) Notice: Subject to any disclaimer, the term of this patent is extended or adjusted under 35 U.S.C. 154(b) by 0 days.

(21) Appl. No.: 15/016,705

(22) Filed: Feb. 5, 2016

(65) Prior Publication Data
US 2017/0229093 A1  Aug. 10, 2017

(51) Int. Cl.
*G06F 13/14* (2006.01)
*G09G 5/00* (2006.01)

(52) U.S. Cl.
CPC ..... *G09G 5/006* (2013.01); *G09G 2340/0407* (2013.01); *G09G 2360/02* (2013.01);
(Continued)

(58) Field of Classification Search
CPC ....... G09G 2370/047; G09G 2370/042; G09G 2340/0407; G09G 2370/04; G09G 2370/12; G09G 5/003; G09G 2300/026; G09G 5/391; G06F 3/14; G06F 3/1446; G06F 3/147
See application file for complete search history.

(56) References Cited

U.S. PATENT DOCUMENTS

| 2004/0046772 A1* | 3/2004 | Ouchi | G09G 5/005 345/690 |
| 2007/0076006 A1* | 4/2007 | Knepper | G06F 3/14 345/520 |

(Continued)

FOREIGN PATENT DOCUMENTS

| CN | 103109294 A | 5/2013 |
| TW | 200801949 A | 1/2008 |

(Continued)

OTHER PUBLICATIONS

Taiwanese First Office Action dated Oct. 19, 2016 cited in Application No. 105104031, 12 pgs.
International Search Report dated Sep. 1, 2017 cited in Application No. PCT/IB2017/000147, 11 pgs.

*Primary Examiner* — Hau H Nguyen
(74) *Attorney, Agent, or Firm* — Locke Lord LLP; Tim Tingkang Xia, Esq.

(57) ABSTRACT

A display system for connecting a computer to a display having EDID information. The display system includes a graphics card and an adapter. The graphics card is in communication with the computer and includes: a graphics processor; a graphics card controller coupled to the graphics processor; and a memory coupled to the graphics card controller and the graphics processor. The adapter has an adapter controller, the adapter coupled to the display and coupled to the graphics card, wherein the graphics card controller is configured to query the EDID information from the display and store the EDID information as emulated EDID information in the memory and further wherein the graphics processor reads the emulated EDID information from the memory rather than from the display.

27 Claims, 7 Drawing Sheets

(52) U.S. Cl.
    CPC ... *G09G 2360/04* (2013.01); *G09G 2370/042* (2013.01); *G09G 2370/047* (2013.01); *G09G 2370/12* (2013.01)

(56) References Cited

U.S. PATENT DOCUMENTS

| | | | | |
|---|---|---|---|---|
| 2007/0224844 | A1* | 9/2007 | Chuang | G06F 13/409 439/55 |
| 2008/0055189 | A1* | 3/2008 | Wilk | G06F 3/1431 345/1.3 |
| 2009/0033668 | A1* | 2/2009 | Pederson | G06F 3/14 345/520 |
| 2010/0321395 | A1* | 12/2010 | Maciesowicz | G06F 3/14 345/502 |
| 2013/0067534 | A1* | 3/2013 | Soffer | G06F 3/0227 726/2 |
| 2013/0176496 | A1* | 7/2013 | Sisto | G09G 5/006 348/660 |
| 2015/0049256 | A1* | 2/2015 | Goodart | G06F 13/40 348/836 |
| 2016/0125836 | A1* | 5/2016 | Kim | G09G 5/006 345/520 |

FOREIGN PATENT DOCUMENTS

| | | |
|---|---|---|
| TW | 201218062 A | 5/2012 |
| TW | 201539424 A | 10/2015 |
| TW | M516205 U | 1/2016 |

\* cited by examiner

DISPLAY SYSTEM FOR AN ARRAY OF VIDEO DISPLAYS

BACKGROUND

Display systems comprising multiple displays in a display array are becoming more popular. These arrays typically comprise displays in displays of n by m displays, for example, 2×4, 3×3, 4×3, and 3×4 or in a single row such as 1×4 or 1×6. Large displays of 5×10 displays are not uncommon. These displays are typically driven by a computer with one or more graphic cards. Each display transmits EDID ("Extended Display Identification Data") information to the computer, so that the operating system of the computer knows the capabilities of the display. The operating system will arrange the displays in order to display one or more "desktops" of information, for example portions of video feeds. So long as all displays remain connected and functioning, the system will generally operate as planned.

Unfortunately, when a display is disconnected or fails, the operating system will reorder the displays and the once coherent video displayed across the displays may become scrambled. When the display is replaced or cabling fixed, the operating system does not necessarily return to the same display arrangement. Thus, it is common for so called "video walls" to have scrambled video both during and after display or cable failure.

In addition, existing systems take a great deal of processing power to drive these video walls. Often, this puts limitations on the number of displays that can be driven, the resolution that can be driven of each display, and/or large minimal processing power of the computers driving the systems.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
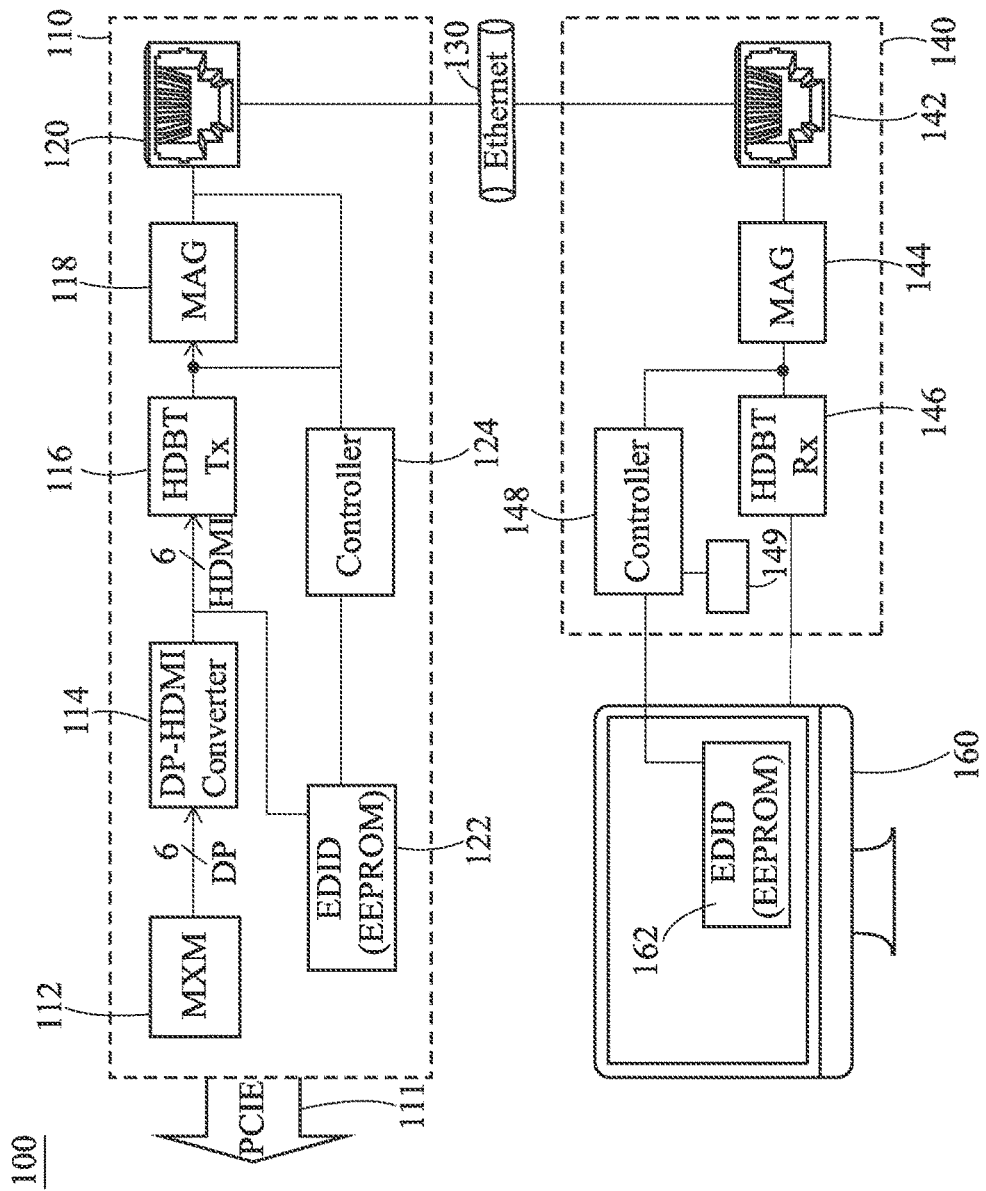
FIG. 1 is a block diagram of an exemplary display system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This disclosure provides a display system and a method for EDID emulation. Extended display identification data (EDID) is a data structure provided by a digital display to describe its capabilities to a video source (e.g. graphics card or set-top box). It is what enables a modern personal computer to know what kinds of displays are connected to it and the capabilities of such displays. EDID is defined by a standard published by the Video Electronics Standards Association (VESA). The EDID may include manufacturer name and serial number, product type, phosphor or filter type, timings supported by the display, display size, luminance data and pixel mapping data.

In the display system, from a controller of a display adapter, a controller of a graphics card receives and stores an EDID of a display as an emulated EDID in an EEPROM of the graphics card. In this detailed description, the term "adapter" refers to either an external display dongle, an internal dongle, a controller card in a display, or a daughter card mounted or connected to a controller card in a display. A graphics card reads the emulated EDID in the EEPROM of the graphics card as if reading from the display. The display system enables relative positioning of the screens on multiple displays to remain the same even if one display is disconnected from the graphics card.

The controller of the graphics card updates the emulated EDID in the EEPROM of the graphics card based on model information within the emulated EDID. The controller sends the model information to an application via an interface such as a USB ("Universal Serial Bus") interface. Typically, the USB interface will emulate one or more serial ports to allow applications on the host to access one or more of the communication channels comprising the controller of the graphics card itself as well as the EDID within the display itself, the emulated EDID, a default manufacturing EDID and a collection of typical EDIDs stored within the controller of the graphics card. The application searches a native resolution corresponding to the desired display over the Internet or over a specific database based on the model information.

Moreover, the graphics card controller modifies the emulated EDID based on the native resolution corresponding to the display. If the application finds the native resolution of the display, the application sends it back to the graphics card controller. After retrieving the native resolution, the application further cooperates with online video conversion services such as Zencoder. Zencoder, as other similar cloud based services, receives through a link or through upload a "native" video of a particular frame-rate, bit-rate, resolution, compression method and format, and then converts, scales, re-formats or re-renders the video using high computing power, into a desired format, which in this case would be a "pixel perfect" video file exactly matching the native resolution of a single screen, or the combined resolution in terms of combined numbers of horizontal and vertical pixels across a multitude of screens. Zencoder then either streams the resulting file back to the computer for streaming display, by providing a link to a file on a storage service or allows the resulting file to be directly downloaded to the PC where the file later can be used by a combination of GPUs and CPUs to output the content through a graphic sub-system. Based on our experimental results, the loading of the GPU and CPU when playing a video stream or locally stored video file may decrease CPU/GPU utilization from 80% down to 20% or less for content before and after such an optimization process, a process we term "pixel nativization".

In some embodiments, the memory can be an array of EEPROMs to store emulated EDIDs for multiple channels. In some embodiments, the memory of the graphic card for storing emulated EDID, if detected to be blank, is initialized with a default EDID by the graphics card controller at first power-up typically after the product manufacturing process in the factory. In some embodiments, in order to facilitate reset operation, a jumper or reset button may be configured or a software command may be issued to reset all of the EDIDs to reset the product to "factory default mode".

FIG. 1 is a block diagram of an exemplary display system in accordance with some embodiments. As shown in FIG. 1, a display system 100 is provided. The display system 100 includes a graphics card 110, a plurality of displays 160, and a plurality of display adapters 140. In some embodiments, the display adapter 140 may be embedded in the display 160. In one embodiment, the graphics card 110 provides six channels of video data respectively to, for example, six display adapters 140. That is, the graphics card 110 drives, for example, six displays. The number of the displays and the display adapters may vary in different embodiments. The mechanism in all of the displays and display adapters is similar, so FIG. 1 simply demonstrates one set of a display 160 and a display adapter 140, and configurations of other sets of displays and display adapters are not repeated herein.

The system described below facilitates tremendous advantages over prior art systems. One feature that permits this is the use of memory, EDID (EEPROM) 122, to store EDID information about each of the displays on the graphics card 110. This is essentially emulated EDID information. Prior art systems rely solely on EDID information stored in the display 160 for reading by the graphics card and use by the computer. In contrast, embodiments described herein treat the EDID information stored in EDID (EEPROM) 122 as if it were the EDID information traditionally always read from the displays 160. Thus, if a display is disconnected, malfunctioning, or missing, whereas prior art systems would act as if no display was present creating a host of problems, the embodiments described herein act as if the displays were all present and accounted for. Loss of one display, two displays, or all displays would not affect the operation and output of the computer and graphics card 110.

In addition, the present system permits the computer to detect when a display is attached, detached, powered up or down, or various states of the display and to store or act upon that information. Additionally, prior art systems read only part of the EDID information from display 160, but the present system permits reading all or some of the EDID information from the display 160. Furthermore, the present system may have EDID information about the displays stored in EDID 122 and preconfigured from the factory or any place, even prior to any displays whatsoever being actually, physically connected to the system.

Also, the present system allows the emulated EDID information in EDID 122 to be modified from the actual EDID information that is actually read from the display 160. For example, a display of native resolution of 1920×1080 may have EDID information noting that it may be set by the operating system at resolution that are non-native, such as 1280×720 or 800×600. The native resolution of the display is the exact number of pixels that matched the actual manufactured horizontal and vertical number of pixels in the actual LCD panel used in the display, which may be different than the reported resolution of the display according to its EDID. Such non-native resolutions will show scaling or stretching artifacts and look "fuzzy" or unclear when viewed on a display. Therefore, the present system, when storing EDID information from display 160, may, by using a database to look up information about the native resolution of the display, only store as emulated EDID information on the native resolution. Thus, the ability to set non-native resolutions that look bad is eliminated. This is termed "EDID Nativization." The use of emulated EDID stored in EDID 122 allows for any type of EDID information to be stored for any particular display 160, regardless of the actual EDID information stored in the display 160.

The graphics card 110 is plugged onto a motherboard (not shown) of a PC via, for example, a PCI Express Interface 111. The graphics card 110 may include a Mobile PCI Express Module (MXM) 112, a video converter 114, an audio/video ("A/V") transmitter 116, a magnetic transformer 118, an RJ45 connector 120, a memory 122, and a controller 124. The Mobile PCI Express Module (MXM) is an interconnect standard for GPUs (MXM Graphics Modules) in laptops using PCI Express. Use of an MXM provides for flexibility in creating graphics cards with the appropriate level of graphics processing power. The MXM 112 is connected to the video converter 114, for example, a Display Port to HDMI converter. The MXM 112 provides, for example, six channels of video data via DisplayPort interface to the video converter 114. DisplayPort is a digital display interface developed by the Video Electronics Standards Association (VESA), and is primarily used to connect a video source to a computer display, though it can also be used to carry audio, USB, and other forms of data.

The output of the video converter 114 is connected to the audio/video transmitter 116 and to an EDID (EEPROM) 122. The video converter 114 receives and outputs video data to audio/video transmitter 116 via HDMI interface. The audio/video transmitter 116 is further connected to the magnetic transformer 118 and transmits audio/video signal. Existing technology examples of an audio/video transmitters and receivers are: Valens chipsets utilizing HDBaseT standard and Aptovision BlueRiver chipsets using standard IP based systems. Those skilled in the art after reading this disclosure would appreciate that other chip sets with other standards could be used as the audio video transmitter 116. The audio/video signal may be HDBaseT. HDBaseT is a consumer electronic and commercial connectivity standard for transmission of uncompressed high-definition video, audio, power, home networking, Ethernet, USB, and some control signals, over a common category (ordinary Cat5 may be used, but Cat6e or above provides for longer reach) cable with a standard connector (RJ45). HDBaseT can be transmitted over category 6a cables or above up to 100 meter long, with 8P8C modular connectors of the type commonly used for local area network connections. The magnetic transformer 118 is designed and manufactured to comply with the appropriate standard, such as HDBaseT standards.

The video data from the audio/video transmitter 116 is sent to a local area network 130, such as Ethernet, by using the RJ45 connector 120. For example, HDBaseT supports the 100 Mbit/s version of Ethernet over twisted pair known as 100BASE-T. This can provide Internet access, or enable televisions, stereos, computers and other devices to communicate with each other and access multimedia content, including video, pictures and music stored on the local network. In some embodiments, the local area network 130 for carrying the video data can be replaced by the Internet with proper security guidance.

The controller 124 is connected to the EDID (EEPROM) 122 and both sides of the magnetics 118. The controller 124 may be a digital signal processor, a processor, a microprocessor, or a microcomputer on a chip. From the local area network 130, the controller 124 receives and stores an EDID of a display 160 as an emulated EDID in the memory 122 (such as EEPROM) of the graphics card 110. More details of such EDID's being transmitted to the controller 124 will be shown later. The MXM 112 reads the emulated EDID in the memory 122 of the graphics card 110 as if reading from the display 160. In some embodiments, the memory 122 can be an array of EEPROMs to store emulated EDIDs for multiple channels. In some embodiments, the EDID 122 of the graphics card 110 for storing emulated EDID is initialized with default EDID during manufacture. In some embodiments, in order to facilitate reset operation, a jumper or switch may be configured to reset all of the EDIDs one at a time.

In the embodiment, the graphics card 110 sends, for example, six channels of video data and drives six display adapters, respectively. Accordingly, the controller 124 is configured to receive EDIDs for six channels and store them in an array of EEPROMs. In the embodiment, control signals from the controller 124 and video data from audio/video transmitter 116 are superimposed on the input of the magnetic transformer 118 and then sent to the display adapter 140.

The display adapter 140 includes an RJ45 connector 142, a magnetic transformer 144, audio/video receiver 146, and a controller 148. The magnetic transformer 144 is designed and manufactured to comply with the appropriate standard, such as the HDBaseT standards. The audio/video receiver 146 receives video data from the audio/video transmitter 116, by using the RJ45 connector 142 and the local area network 130. Existing technology examples of an audio/video transmitters and receivers are: Valens chipsets utilizing HDBaseT standard and Aptovision BlueRiver chipsets using standard IP based systems. Those skilled in the art after reading this disclosure would appreciate that other chip sets with other standards could be used as the audio video receiver 146.

The display 160 is connected to the display adapter 140 via HDMI interface. A memory 162 (such as EEPROM) storing an EDID of the display 160 is powered by HDMI interface even if the display is turned off. The controller 148 of the display adapter 140 may read and store the EDID of the display 160 in a memory 149 (such as EEPROM), but some embodiments do not have local storage of the EDID in a memory 149. The controller 148 may be a digital signal processor, a processor, a microprocessor, or a microcomputer on a chip. The controller 148 of the display adapter 140 communicates with controller 124 of graphics card 110 to facilitate the transfer of EDID information between the display 162 and the graphics card 110. In alternative embodiments, the EDID of the display is read directly by the graphics card without the need for a controller 148.

Operation of the system is described in the description of FIG. 5 below. In summary, the graphics card 110 operates in conjunction with the adapter 140 to retrieve EDID information from the display 160, store the EDID information in EEPROM 122, and use this emulated EDID information in operation of the display. The emulated EDID information in EEPROM 122 may be altered such that non-native resolutions of the display 160 are removed. Furthermore, upon initial power-up of a system containing graphics card 110, dummy EDID information will be stored in emulated EDID EEPROM 122, even with no display connected to the system. Upon a Hot Plug Detect (HPD) high signal, the actual display information is fetched and replaces the dummy EDID information in EEPROM 122. If the display 160 becomes disconnected from the graphics card 110, the system continues to operate as if the display 160 was connected, because the system uses the emulated EDID information in EEPROM 122, rather than the actual EDID information in a display. This system facilitates consistent placement of displays relative to each other, as will be described in the following paragraphs.

Figure 2A:
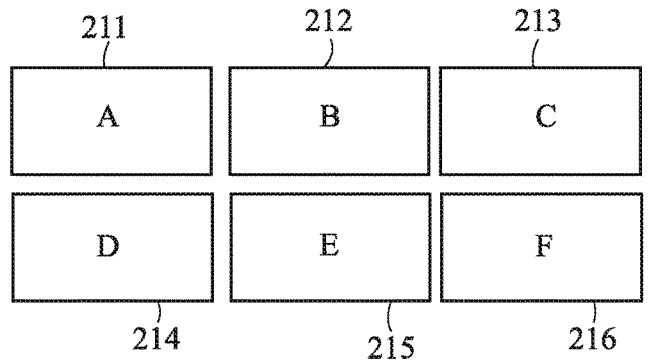
FIGS. 2A-2C are block diagrams of a conventional display system without emulation mechanism in accordance with some embodiments.
Figure 2B:
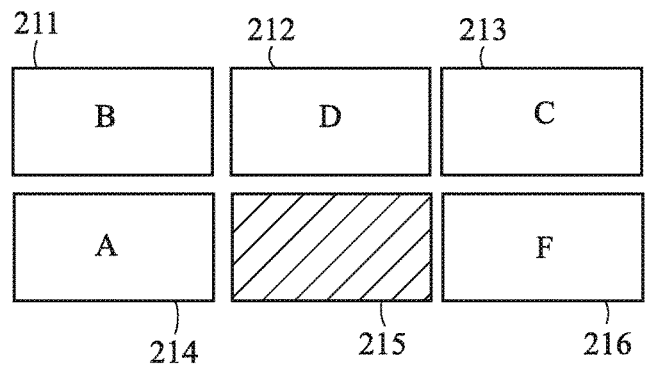
Figure 2C:
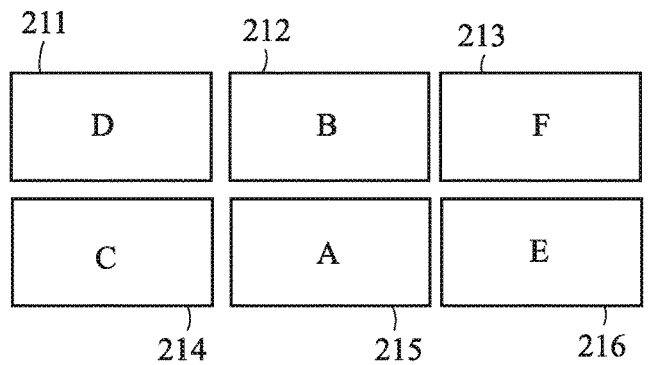

FIGS. 2A-2C are block diagrams of a conventional display system without emulation mechanism in accordance with some embodiments. As shown in FIG. 2A, a display array 200 with six displays 211-216 are all connected to one graphics card (not shown). The display 211-216 are configured to show characters "A", "B", "C", "D", "E", and "F".

If the display 215 is disconnected from the graphics card (not shown), as shown FIG. 2B, the displays 211-214 and 216 no longer show the same characters, but shows "B", "D", "C", "A", and "F". It is because the graphics card scans the displays 211-214 and 216 if the configurations between at least one of the displays and the graphics card changes. And the graphics card may not scan all the displays 211-216 in the same order, resulting in the video data to be demonstrated on the displays' 211-214 and 216 being re-arranged. After that, if the display 215 is reconnected to the graphics card, then the graphics card scans all of the displays 211-216 again. As shown in FIG. 2C, the displays 211-216 shows "D", "B", "F", "C", "A", and "E". The scan of the graphics card results in the video data being demonstrated on the displays' 211-216 to be re-arranged in another manner. One can appreciate the misalignment this will cause a single video image spread across displays 211-216.

Figure 3A:
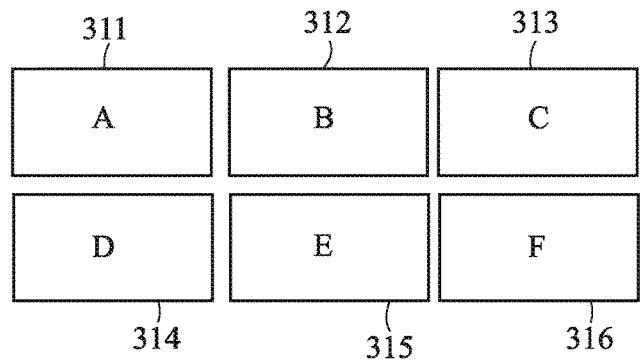
FIGS. 3A-3D are block diagrams of an exemplar display system with emulation mechanism in accordance with some embodiments.

FIGS. 3A-3D are block diagrams of an exemplary display system with emulation mechanism in accordance with some embodiments. As shown in FIG. 3A and FIG. 1, a display array 300 with six displays 311-316 are all connected to one graphics card 110 and display adapters (not shown) respectively.

The controller 124 of the graphics card 100 reads and stores EDID information for each display 311-316 in EDID EEPROM 122. The MXM 112 reads the emulated EDIDs in the memory 122 of the graphics card 110 as if reading from the displays 311-316. As such, the displays 311-316 are configured to show characters "A", "B", "C", "D", "E", and "F" as shown in FIG. 3A.

Figure 3B:
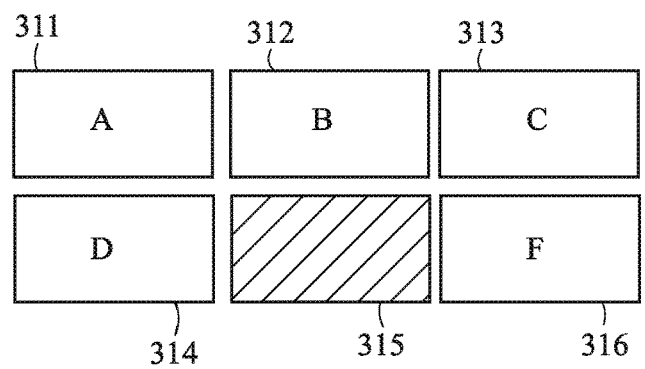

In the example, if the display 315 is disconnected from the graphics card 110, the MXM 112 continues to read the emulated EDID of display 315 and continues to still see a display there (even though it is not there). Therefore, even though the display 315 is disconnected, all of the emulated EDIDs in the EEPROM 122 of the graphics card 110 to be read by the MXM 112 still remain the same. The MXM 112 reads the emulated EDIDs in the EEPROM 122 as if from the display 315 and outputs video data as if the display 315 is still connected. As such, the displays 311-316 are configured to show characters "A", "B", "C", "D", blank, and "F" as shown in FIG. 3B.

Figure 3C:
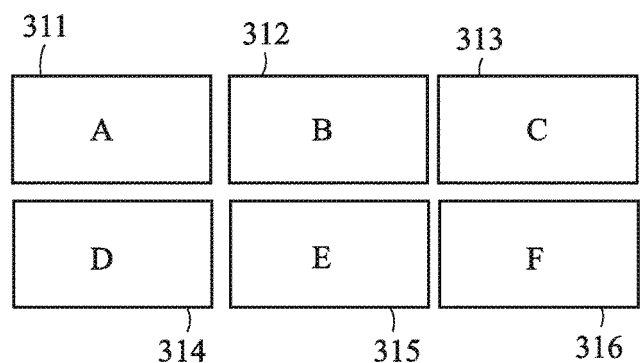

After that, if the display 315 is reconnected to the graphics card 110, the graphics card 110 detects an HPD high event, triggering a comparison of the EDID of the display 315 and the emulated EDID in the EEPROM 122. If they are the same, nothing happens. The MXM 112 reads the emulated EDIDs in the EEPROM 122 as if from the display 315 and outputs video data as that in FIG. 3A. As such, the displays 311-316 are configured to show characters "A", "B", "C", "D", "E", and "F" as shown in FIG. 3C.

Figure 3D:
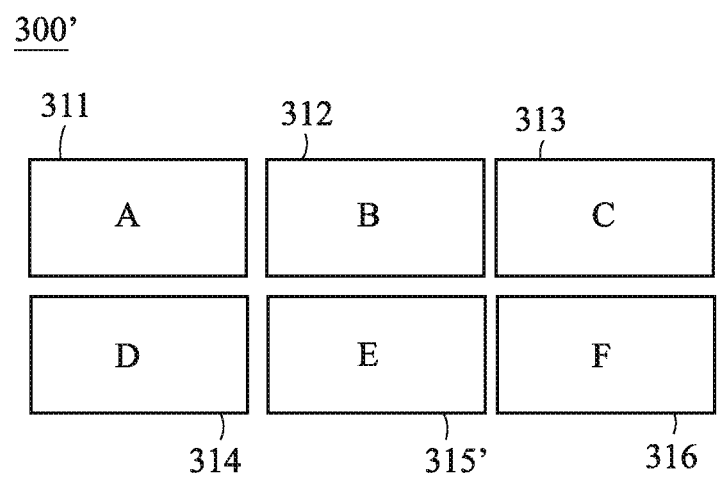

In some embodiments, as shown in FIG. 3D, if a new display 315' replaces the display 315, then the controller 124 detects a new EDID other than the emulated EDID (of the display 315) in the EEPROM 122. At this time, the controller 124 stores the new EDID of the new display 315' in the EEPROM 122. While the emulated EDIDs in the EEPROMs 122 of the graphics card 110, except for that corresponding to the new display 315', remains the same. The controller 124 of the graphics card 110 updates the emulated EDID in the EEPROM 122 of the graphics card 110 with the new EDID corresponding to the new display 315'. The displays 311-314, 315', and 316 are configured to show characters "A", "B", "C", "D", "E", and "F" as shown in FIG. 3D. Relative positioning of the characters on the displays 311-314, 315', and 316 is the same because the MXM 112 reads the EEPROM addresses that stores the emulated EDID in the same manner as that in FIG. 3A.

Figure 4:
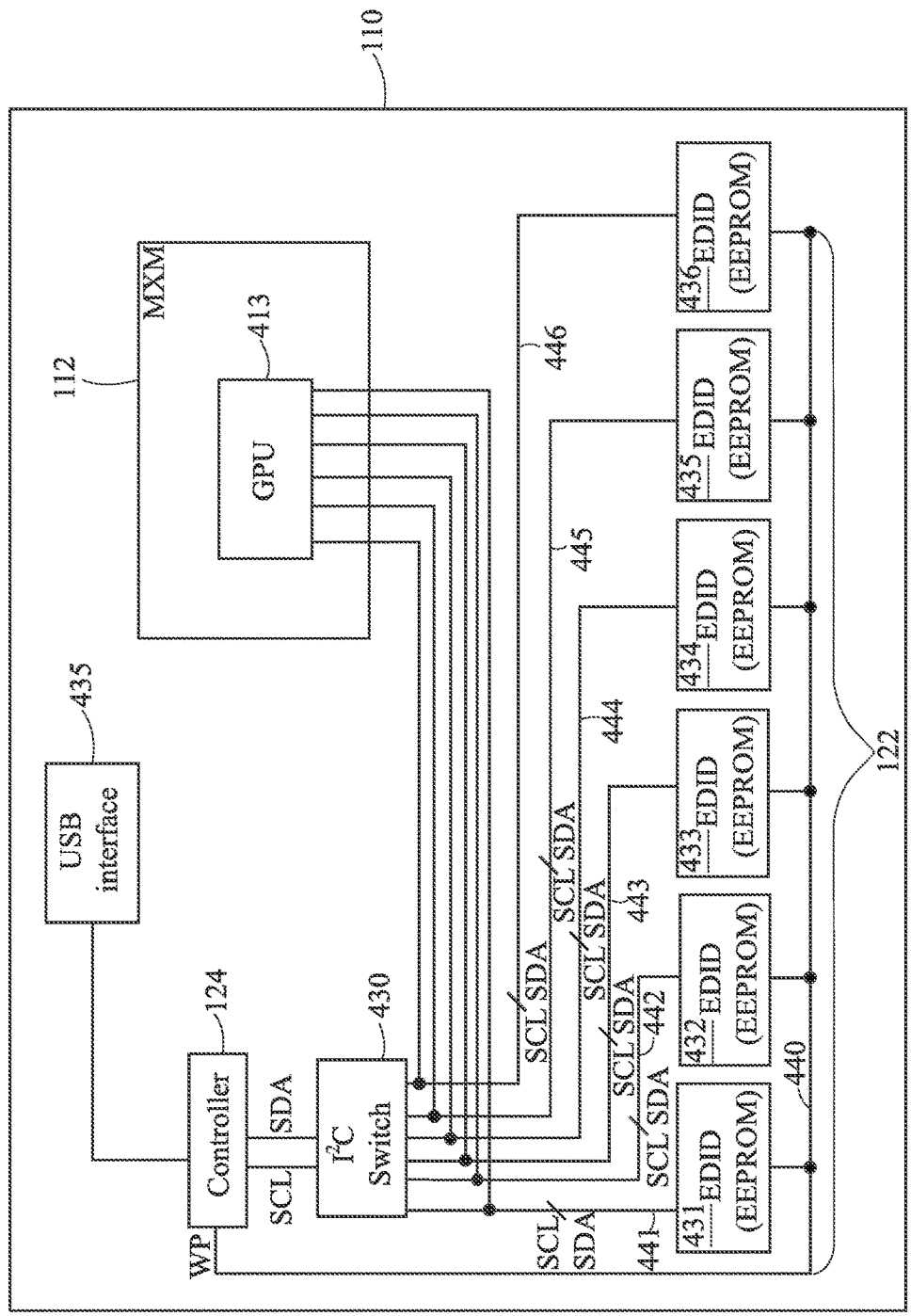
FIG. 4 is a block diagram of further details of FIG. 1 in accordance with some embodiments.

FIG. 4 is a block diagram of further details of FIG. 1 in accordance with some embodiments. As shown in FIG. 4, a graphics card 110 is provided. The graphics card 110 includes a Mobile PCI Express Module (MXM) 112, a switch 430, EEPROMs 431-436, a communications interface 435, and a controller 124. The MXM 112 includes a GPU 413 providing video data to, for example, six channels.

As shown in FIG. 1, the controller 110 receives and stores an EDID of a display 160 as an emulated EDID in the memory 122 of the graphics card 110. FIG. 4 shows more details about how the controller works. Please refer to FIGS. 1 and 4. The controller 124 stores the EDID of the display 160 by using the switch 430 to access the EEPROMs 122. The switch 430 communicates with the controller 124 via I²C Bus. I²C uses two bidirectional open-drain lines, Serial Data Line (SDA) and Serial Clock Line (SCL), pulled up with resistors. The controller has a Write Protect line in communication with EEPROMs 122. The controller 124 further updates the emulated EDID in the EEPROMs 122 over SDA and SCL (441-446) based on model information (such as DELL U2415) in the emulated EDID. The controller 124 sends the model information (such as DELL U2415) to an application via a serial interface, such as USB interface 435. The application searches for a native resolution (such as 1920×1200) corresponding to the display 160 over the Internet or a specific database based on the model information (example, DELL U2415). The native resolution of a LCD, LCoS or other display refers to its single fixed resolution of actual number of pixels. As an LCD display consists of a fixed raster, it cannot change physical resolution to match the signal being displayed, meaning that optimal display quality can be reached only when the signal input matches the native resolution. Moreover, the controller 124 modifies the emulated EDID based on the native resolution (such as 1920×1200) corresponding to the display 160.

For example, if the application finds the native resolution of the display 160, the application sends it back to the controller 124. The controller 124 adds the native resolution corresponding to the display 160 to the emulated EDID in the EEPROM 431 of the graphics card 110, and may remove the remaining resolutions except for the native resolution within the emulated EDID in the EEPROM 431 of the graphics card 110.

After retrieving the native resolution, the application further cooperates with a video player (for example, online video conversion service, such as Zencoder). Zencoder takes care of video scaling which requires high computing power, and sends "pixel perfect" video stream back to the system. Pixel perfect refers to: that the number of pixels in the video source perfectly align to a native resolution of a display. Based on our experimental results, the loading of the GPU 413 and CPU (not shown) when playing video stream may decrease from 80% to 20% due to the pixels perfectly matching the actual resolution of the displays.

Communications interface 435 may be any type of communications port. For example, it may be a serial port, such as a USB port. Those skilled in the art will appreciate that any type of communications port of any protocol could be used and interfaced with graphics card controller 124. Communications interface 435 may be in communication with, for example, the host computer in which adapter 110 is mounted. Thus, the host computer can communicate via communications interface 435 directly with the graphics card controller 124. For example, applications or web browsers may open a port to communicate directly with a graphics card controller 124 to issue commands or requests of the graphics card controller 124.

As the graphics card controller 124 is in communication with the adapter controller 148, the host computer can effectively issue commands or requests to the display 160. For example, the controllers 124 and 148 may cooperate to issue commands to the display 160 using the Consumer Electronics Control ("CEC") protocol. Using CEC, the host computer can issues commands to, for example, turn displays on or off; adjust contrast or brightness; or adjust color. CEC can also be used to query information from the displays, such as the model, serial number, and manufacturing date of the display.

Those skilled in the art after reading this disclosure can understand the broad range of use that this unique ability allows. For example, a database can be established, either locally at the host computer or in the cloud, that could store information about the displays that comprise a video wall—essentially an inventory of the displays that make up a video wall along with information about each of the displays. An application or web browser would open a port to the communications interface 435 of the graphics card 110. The application or web browser would then query each, or only a select number, of displays attached to the system; retrieve information about each of the displays; and store this information in the database. Thus, a near instant inventory of a display wall could be accomplished.

Figure 5:
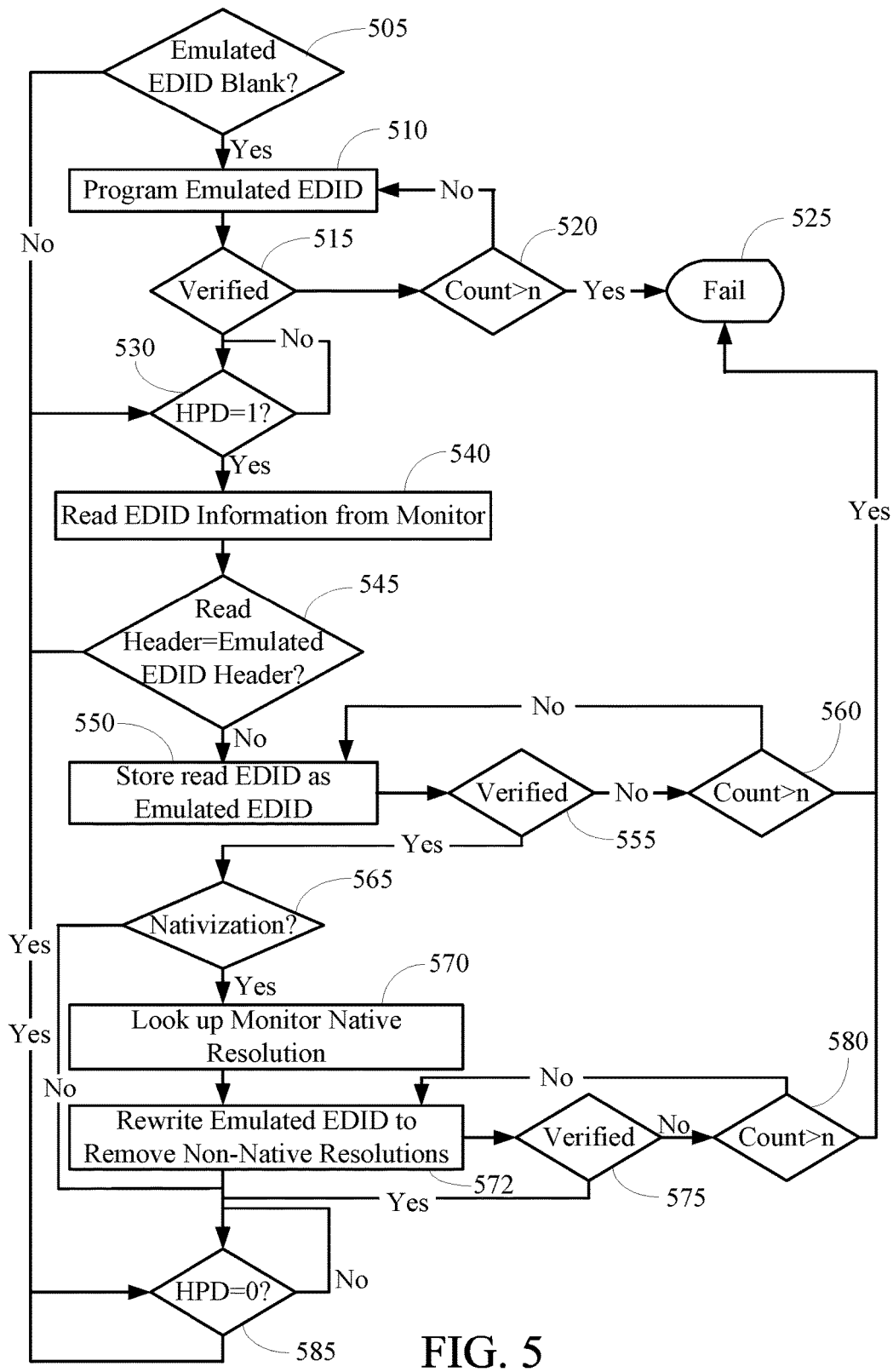
FIG. 5 is a flow chart of a method for EDID emulation in accordance with some embodiments.

FIG. 5 is a flow chart of a method for EDID emulation in accordance with some embodiments. Upon initial power-up of a system, the method may determine whether emulated EDID, typically stored in EEPROM, is blank (stage 505). If not blank, the method continues at stage 530 described below. If the emulated EDID is blank, denoting that the system has not previously been powered-up, the method will program the EEPROM's emulated EDID with generic EDID information (stage 510). This generic information may be preselected and may be, for example, EDID information for a display having a 1024×768 display. Those skilled in the art after reading this disclosure will appreciate that other values could be chosen. After writing the generic EDID information to the EEPROM, the method will check if the programming of the EEPROM was successful (stage 515). If not successful and the number of attempted writes (denoted as "Count" in the figure) is less than a preset number n, for example, three, (stage 520) then the system will increment Count and again attempt to program the EEPROM (stage 510). If not successful and the number of attempted writes is equal to or greater than n (stage 520), then the method will let a user know that a write attempt to the emulated EDID EEPROM has failed, typically by, for example, lighting or flashing an LED (stage 525).

If the write of the emulated EDID was verified as correct (stage 515), the method will wait to detect whether a display has been plugged in (Hot Plug Detect, HPD, going high) (stage 530). If a display has been detected by HPD going high (stage 530), EDID information is read from the display that has been attached (stage 540). Next, a check is made to see if the header of the read EDID information matches the header of the emulated EDID stored in the EEPROM (stage 540). The header of the EDID contains the model number and serial number of the attached display, thus the method can determine whether a new or different display has been attached. If the information matches, the method continues at stage 585 described below.

If the header information read from the display does not match the header information in the emulated EDID, a new or different display has been attached and the read EDID information is stored in the EEPROM as emulated EDID (stage 550). After writing the EDID information to the EEPROM, the method will check if the programming of the EEPROM was successful (stage 555). If not successful and the number of attempted writes (denoted as "Count" in the figure) is less than a preset number n, for example, three, (stage 560) then the system will increment Count and again attempt to program the EEPROM (stage 550). If not successful and the number of attempted writes is equal to or greater than n (stage 560), then the method will let a user know that a write attempt to the emulated EDID EEPROM has failed, typically by, for example, lighting or flashing an LED (stage 525).

Following a successful write of the actual EDID information from the display to the emulated EDID EEPROM, the method will determine whether a Nativization option has been activated. If not, the method continues at stage 585. If Nativization has been activated (stage 565), the method will look up the native resolution of the display (stage 570). Native resolution of the display may be stored in a lookup table at the local system, may be located on a remote server, or may be stored in the cloud. Those skilled in the art will appreciate after reading this disclosure how databases can be created and accessed to hold, maintain, and update native display resolutions for various models of displays. Typically using the model number of the display, the native resolution of the display is retrieved from the database or lookup table (stage 570).

At this point, the emulated EDID is rewritten to the EEPROM to remove non-native resolutions from the list of resolutions supported by the display (stage 572). Thus, the display will be operated by the system at its native resolution, providing picture perfect quality. After writing the EDID information to the EEPROM, the method will check if the programming of the EEPROM was successful (stage 575). If not successful and the number of attempted writes (denoted as "Count" in the figure) is less than a preset number n, for example, three, (stage 580) then the system will increment Count and again attempt to program the EEPROM (stage 572). If not successful and the number of attempted writes is equal to or greater than n (stage 580), then the method will let a user know that a write attempt to the emulated EDID EEPROM has failed, typically by, for example, lighting or flashing an LED (stage 525).

Following a successful write to the EEPROM, the method will wait to see if the display becomes disconnected (stage 585). If not, the method waits (stage 585). If it does become disconnected, the method returns to stage 530 to wait for a display to become plugged in.

Figure 6:
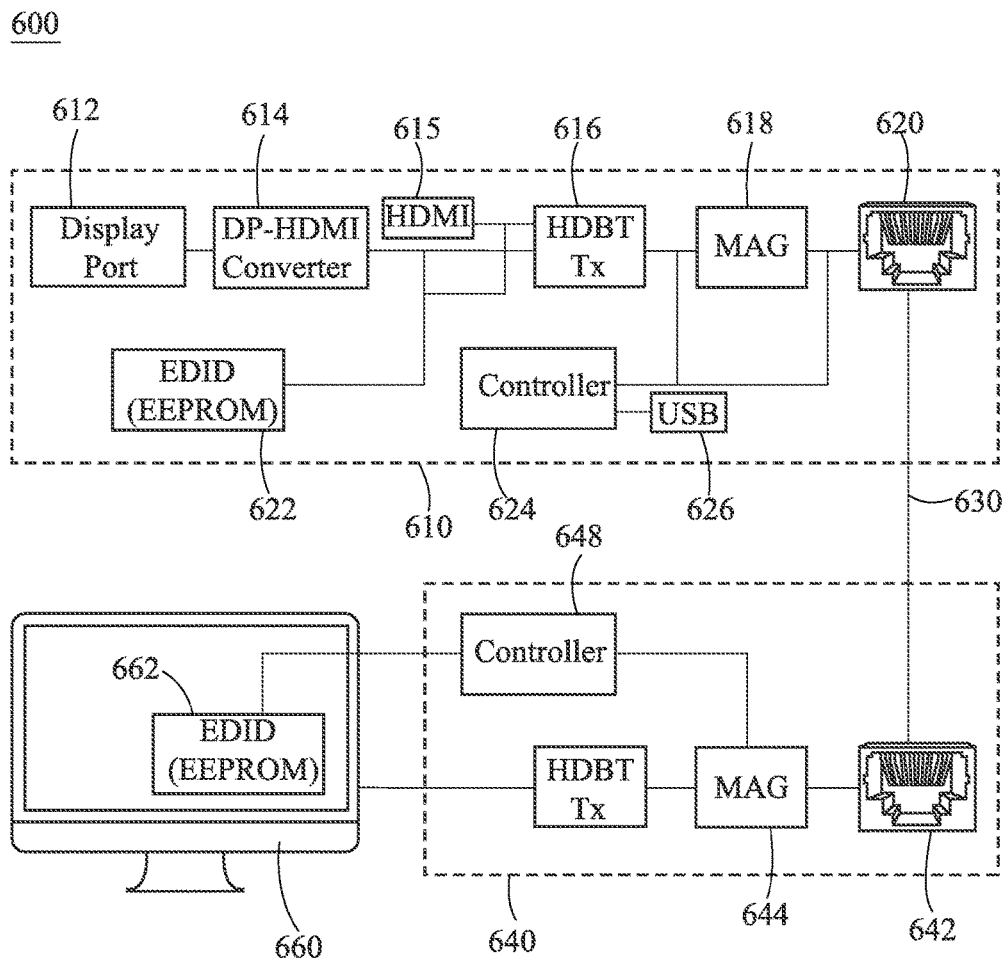
FIG. 6 is a block diagram of an exemplary display system in accordance with some embodiments.

One additional embodiment is disclosed in FIG. 6. FIG. 6 is a block diagram of an exemplary display system in accordance with some embodiments. As shown in FIG. 6, a display system 600 is provided. The display system 600 includes a graphics card 610, a display 660, and a display adapters 640. In some embodiments, the display adapter 640 may be embedded in the display 660. In one embodiment, the graphics card 610 provides a single channel of video data to the display adapter 640. Graphics card 610 may be mounted in an enclosure external to a computer system.

The system described below facilitates tremendous advantages over prior art systems. One feature that permits this is the use of memory, EDID (EEPROM) 622, to store EDID information about the display 660 on the graphics card 610. This is essentially emulated EDID information. Prior art systems rely solely on EDID information stored in the display 160 for reading by the graphics card and use by the computer. In contrast, embodiments described herein treat the EDID information stored in EDID (EEPROM) 622 as if it were the EDID information traditionally always read from the displays 660. Thus, if a display is disconnected, malfunctioning, or missing, whereas prior art systems would act as if no display was present creating a host of problems, the embodiments described herein act as if the display was. Loss of the display would not affect the operation and output of the computer and graphics card 110.

In addition, the present system permits the system 600 to detect when a display is attached, detached, powered up or down, or various states of the display and to store or act upon that information. Additionally, prior art systems read only part of the EDID information from display 660, but the present system permits reading all or some of the EDID information from the display 660. Furthermore, the present system may have EDID information about the displays stored in EDID 122 and preconfigured from the factory or any place, even prior to any display being actually, physically connected to the system 600.

Also, the present system allows the emulated EDID information in EDID 622 to be modified from the actual EDID information that is actually read from the display 660. For example, a display of native resolution of 1920×1080 may have EDID information noting that it may be set by the operating system at resolution that are non-native, such as 1280×720 or 800×600. Therefore, the present system, when storing EDID information from display 660, may, by a computer in conjunction with serial port 626 and using a database look up information about the native resolution of the display and only store as emulated EDID information on the native resolution. Thus, the ability to set non-native resolutions that look bad is eliminated. The use of emulated EDID stored in EDID 622 allows for any type of EDID information to be stored for any particular display 660, regardless of the actual EDID information stored in the display 660.

The graphics card 610 is external to a computer and interfaces to a computer via a graphics connector, such as a Display Port connector 612 or an HDMI connector 615. DisplayPort is a digital display interface developed by the Video Electronics Standards Association (VESA), and is primarily used to connect a video source to a computer display, though it can also be used to carry audio, USB, and other forms of data. The graphics card 610 may include a video converter 614, an audio/video ("A/V") transmitter 616, a magnetic transformer 618, an RJ45 connector 620, a memory 622, and a controller 624. The Display Port connector 612 is connected to the video converter 614, for example, a Display Port to HDMI converter.

The output of the video converter 614 is connected to the audio/video transmitter 616 and to an EDID (EEPROM) 622. The video converter 614 outputs video data to audio/video transmitter 616 via HDMI interface. Furthermore, the HDMI connector is connected to audio/video transmitter 616. Thus, either Display Port video from Display Port connector 612 or HDMI video from HDMI connector 615 may be transmitted. The audio/video transmitter 616 is further connected to the magnetic transformer 618 and transmits audio/video signal. Existing technology examples of an audio/video transmitters and receivers are: Valens chipsets utilizing HDBaseT standard and Aptovision BlueRiver chipsets using standard IP based systems. Those skilled in the art after reading this disclosure would appreciate that other chip sets with other standards could be used as the audio video transmitter 616. The audio/video signal may be HDBaseT. HDBaseT is a consumer electronic and commercial connectivity standard for transmission of uncompressed high-definition video, audio, power, home networking, Ethernet, USB, and some control signals, over a common category (ordinary Cat5 may be used, but Cat6e or above provides for longer reach) cable with a standard connector (RJ45). HDBaseT can be transmitted over category 6a cables or above up to 100 meter long, with 8P8C modular connectors of the type commonly used for local area network connections. The magnetic transformer 118 is designed and manufactured to comply with the appropriate standard, such as HDBaseT standards.

The video data from the audio/video transmitter 616 is sent to a local area network 630, such as Ethernet, by using the RJ45 connector 620. For example, HDBaseT supports the 100 Mbit/s version of Ethernet over twisted pair known as 100BASE-T. This can provide Internet access, or enable televisions, stereos, computers and other devices to communicate with each other and access multimedia content, including video, pictures and music stored on the local network. In some embodiments, the local area network 630 for carrying the video data can be replaced by the Internet with proper security guidance.

The controller 624 is connected to the EDID (EEPROM) 622 and both sides of the magnetics 618. It is also connected to serial port 626. The controller 624 may be a digital signal processor, a processor, a microprocessor, or a microcomputer on a chip. From the local area network 630, the controller 624 receives and stores an EDID of a display 660 as an emulated EDID in the memory 622 (such as EEPROM) of the graphics card 610. A PC connected to the Display Port interface 612 or the HDMI interface 615 reads the emulated EDID in the memory 622 of the graphics card 610 as if reading from the display 660. In some embodiments, the EDID 622 of the graphics card 610 for storing emulated EDID is initialized with default EDID during manufacture. In some embodiments, in order to facilitate reset operation, a jumper or switch may be configured to reset the emulated EDID.

The controller 624 is configured to receive EDIDs for six channels and store them in an array of EEPROMs. In the embodiment, control signals from the controller 624 and video data from audio/video transmitter 616 are superimposed on the input of the magnetic transformer 618 and then sent to the display adapter 640.

The display adapter 640 includes an RJ45 connector 642, a magnetic transformer 644, audio/video receiver 646, and a controller 648. The magnetic transformer 644 is designed and manufactured to comply with the appropriate standard, such as the HDBaseT standards. The audio/video receiver 646 receives video data from the audio/video transmitter 616, by using the RJ45 connector 642 and the local area network 630. Existing technology examples of an audio/video transmitters and receivers are: Valens chipsets utilizing HDBaseT standard and Aptovision BlueRiver chipsets using standard IP based systems. Those skilled in the art after reading this disclosure would appreciate that other chip sets with other standards could be used as the audio video receiver 646.

The display 660 is connected to the display adapter 640 via HDMI interface. A memory 662 (such as EEPROM) storing an EDID of the display 160 is powered by HDMI interface even if the display is turned off. The controller 648 of the display adapter 640 may read and store the EDID of the display 660. The controller 648 may be a digital signal processor, a processor, a microprocessor, or a microcomputer on a chip. The controller 648 of the display adapter 640 communicates with controller 624 of graphics card 610 to facilitate the transfer of EDID information between the display 662 and the graphics card 610. In alternative embodiments, the EDID of the display is read directly by the graphics card without the need for a controller 648.

Operation of the system is described briefly below. In summary, the graphics card 610 operates in conjunction with the adapter 640 to retrieve EDID information from the display 660, store the EDID information in EEPROM 622, and use this emulated EDID information in operation of the display. The emulated EDID information in EEPROM 622 may be altered such that non-native resolutions of the display 660 are removed. Furthermore, upon initial power-up of a system containing graphics card 610, dummy EDID information may be stored in emulated EDID EEPROM 622, even with no display connected to the system. Upon a Hot Plug Detect (HPD) high signal, the actual display information is fetched and replaces the dummy EDID information in EEPROM 622. If the display 660 becomes disconnected from the graphics card 610, the system continues to operate as if the display 660 was connected, because the system uses the emulated EDID information in EEPROM 622, rather than the actual EDID information in a display.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A display system for emulating the connection of a networked display to a computer, the system comprising:
    a graphics card, graphics module or discrete on-board graphics circuitry within the computer;
    a Hot Plug Detect pin; and
    a memory physically located within the graphics card, graphics module or discrete on-board graphics circuitry and storing pre-programmed default manufacturing Extended Display Identification Data (EDID) information emulating a display that is presented to the graphics card, graphics module or discrete on-board graphics circuitry when a high signal is applied to the Hot Plug Detect pin,
    wherein the pre-programmed default manufacturing EDID information causes the computer to enable video output to the display even though the display has never been physically connected to the computer, and wherein a first part of data pertaining to the manufacturer of the display within the pre-programmed default manufacturing EDID information that corresponds to native resolution of the display is modified such that the pre-programmed default manufacturing EDID information that corresponds to native resolution of the display is different from the actual EDID information of the display, and a second part of data pertaining to the manufacturer of the display within the pre-programmed default manufacturing EDID information that corresponds to non-native resolution of the display is voided or eliminated such that the pre-programmed default manufacturing EDID information that corresponds to native resolution of the display is different from the actual EDID information corresponding to the non-native resolution of the display.

2. The display system of claim 1, wherein the display system continues to present the pre-programmed default manufacturing EDID information emulating the display after the display is physically connected to the computer.

3. The display system of claim 2, further comprising a microcontroller that collects EDID information from the display that is physically connected to the computer and modifies the pre-programmed default manufacturing EDID information based on the collected EDID information,
wherein the memory is an EEPROM connected to a processing unit on the graphics card, graphics module or discrete on-board graphics circuitry.

4. The display system of claim 3, wherein the pre-programmed default manufacturing EDID information is modified by changing one or more of the resolution, refresh rate or color depth of the display.

5. The display system of claim 3, wherein the pre-programmed default manufacturing EDID information is modified by adding one or more of the resolution, refresh rate or color depth of the display.

6. The display system of claim 3, wherein the pre-programmed default manufacturing EDID information is modified by eliminating one or more of the resolution, refresh rate or color depth of the display.

7. The display system of claim 1, wherein the PCI express graphics card, graphics module or discrete on-board graphics circuitry is located on the motherboard.

8. The display system of claim 1, further comprising a display adapter that receives video and audio data through a network and reads the pre-programmed default manufacturing EDID information of the display, wherein the video and audio data is under the HDBaseT standard.

9. The display system of claim 1, further comprising a display adapter that receives video and audio data through a network and reads the pre-programmed default manufacturing EDID information of the display, wherein the video and audio data is transmitted and received using standard IP based systems.

10. A method for emulating the connection of a networked display to a computer through a graphics card, graphics module or discrete on-board graphics circuitry within the computer, wherein said method comprises:
applying a high signal on a Hot Plug Detect (HPD) pin; and
presenting pre-programmed default manufacturing Extended Display Identification Data (EDID) information emulating a display to the graphics card, graphics module or discrete on-board graphics circuitry after the high signal is applied to the Hot Plug Detect pin,
wherein the pre-programmed default manufacturing EDID information is stored in a memory physically located within the graphics card, graphics module or discrete on-board graphics circuitry, and causes the computer to enable video output to the display even though the display has never been physically connected to the computer, and
wherein a first part of data pertaining to the manufacturer of the display within the pre-programmed default manufacturing EDID information that corresponds to native resolution of the display is modified such that the pre-programmed default manufacturing EDID information that corresponds to native resolution of the display is different from the actual EDID information of the display, and a second part of data pertaining to the manufacturer of the display within the pre-programmed default manufacturing EDID information that corresponds to non-native resolution of the display is voided or eliminated such that the pre-programmed default manufacturing EDID information that corresponds to native resolution of the display is different from the actual EDID information corresponding to the non-native resolution of the display.

11. The method of claim 10, wherein the pre-programmed default manufacturing EDID information emulating the display continues to be presented to the graphics card, graphics module or discrete on-board graphics circuitry after the display is physically connected to the computer.

12. The method of claim 11, wherein the pre-programmed default manufacturing EDID information is modified by a microcontroller based on EDID information collected from the display that is physically connected to the computer, and
the memory is an EEPROM connected to a processing unit on the graphics card, graphics module or discrete on-board graphics circuitry.

13. The method of claim 12, wherein the pre-programmed default manufacturing EDID information is modified by changing one or more of the resolution, refresh rate or color depth of the display.

14. The method of claim 12, wherein the pre-programmed default manufacturing EDID information is modified by changing one or more of the resolution, refresh rate or color depth of the display.

15. The method of claim 12, wherein the pre-programmed default manufacturing EDID information is modified by eliminating one or more of the resolution, refresh rate or color depth of the display.

16. A display system comprising:
a PCI express graphics card having a plurality of EEPROMs for a plurality of video channels located on the PCI express graphics card, wherein each EEPROM corresponds to one of the video channels and contains EDID information for one of a group of networked displays, and
a processing unit for connecting the displays to the PCI express graphics card,
wherein the EDID information for each of the networked displays is provided to the processing unit by the corresponding EEPROM rather than being read from the display, and
wherein for a designated display of the networked displays, a first part of data pertaining to the manufacturer of the designated displays within the EDID information stored in the corresponding EEPROM that corresponds to native resolution of the designated display is modified such that the EDID information stored in the corresponding EEPROM that corresponds to native resolution of the designated display is different from the actual EDID information of the designated display, and a second part of data pertaining to the manufacturer of the designated display within the EDID information stored in the corresponding EEPROM that corresponds to non-native resolution of the designated display is voided or eliminated such that the EDID information stored in the corresponding EEPROM that corresponds to native resolution of the designated display is different from the actual EDID information corresponding to the non-native resolution of the designated display.

17. The display system of claim 16, further comprising a microcontroller or microprocessor comprising one or more USB connections attached to a motherboard USB host controller through USB ports on a motherboard, that configures the operations of the PCI express graphics card.

18. The display system of claim 17, wherein the USB connection is one or more emulated serial ports.

19. The display system of claim 18, wherein the USB connection is used to specifically read and write the EDID information stored in the EEPROMs.

20. The display system of claim 19, further comprising a display adapter that receives video and audio data through a network and reads EDID information of the networked displays, wherein the display adapter passes the EDID information of the networked displays to the microcontroller or microprocessor of the PCI Express Graphics Card in place of the EDID of the processing unit.

21. The display system of claim 20, wherein the display adapter is located inside one of the networked displays.

22. The display system of claim 21, wherein the display adapter circuitry is combined with the display circuitry.

23. The display system of claim 20, wherein the video and audio data is under the HDBaseT standard.

24. The display system of claim 20, wherein the video and audio data is transmitted and received using standard IP based systems.

25. The display system of claim 17, wherein the PCI express graphics card is located on the motherboard.

26. The display system of claim 16, wherein the processing unit is located on a module rather than on a main printed circuit board, and the processing unit is connected to the main printed circuit board through a cable or connector.

27. The display system of claim 26, wherein the module is a Mobile PCI Express Module.

* * * * *